Dec. 1, 1964    J. L. WILSON    3,159,344
FRYING APPARATUS
Filed May 6, 1963    3 Sheets-Sheet 1
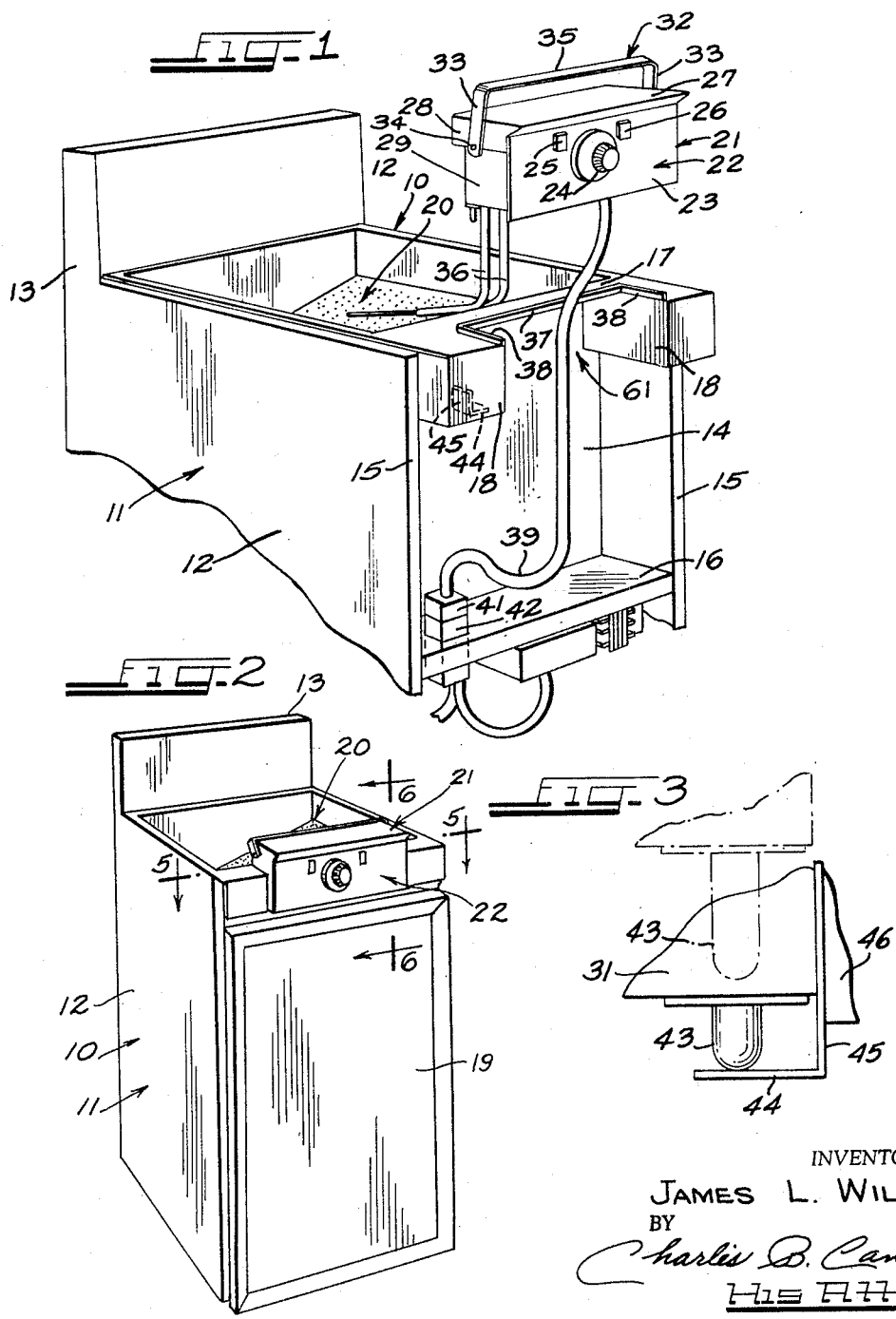
INVENTOR.
JAMES L. WILSON
BY
Charles B. Cannon
His Att'y.

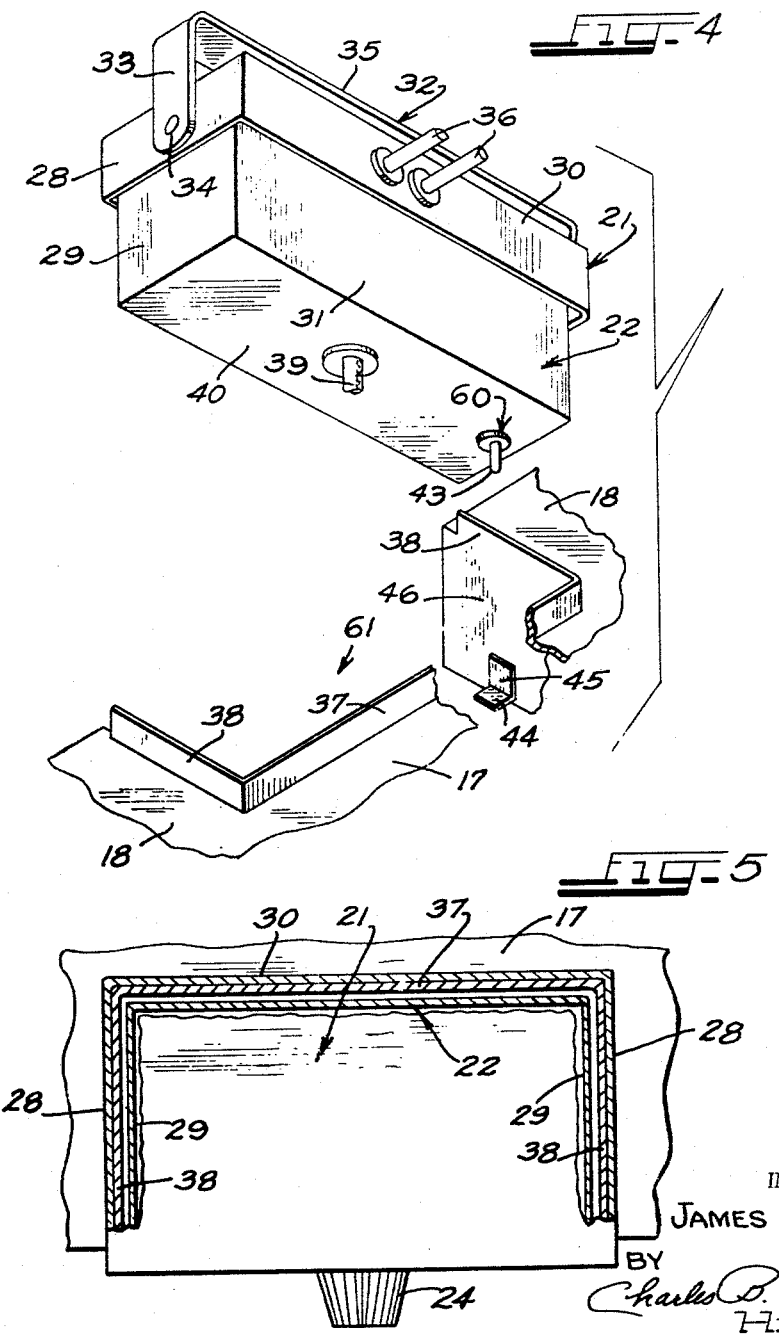

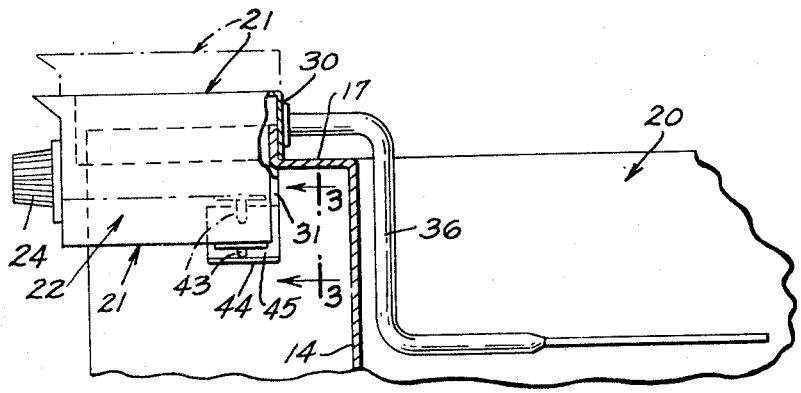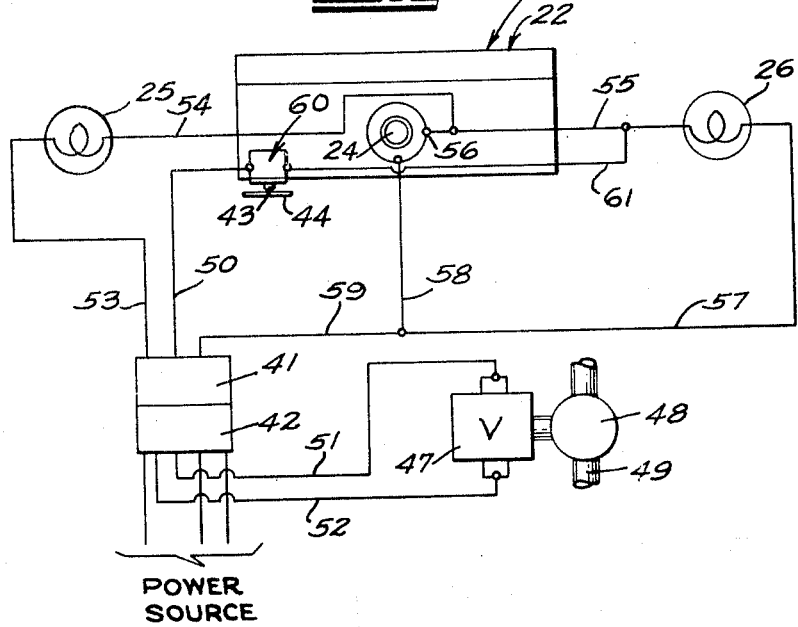

sonal Patent Office 3,159,344
Patented Dec. 1, 1964

3,159,344
FRYING APPARATUS
James L. Wilson, Chicago, Ill., assignor to Wilson Metal Products, Inc., Chicago, Ill., a corporation of Illinois
Filed May 6, 1963, Ser. No. 278,029
7 Claims. (Cl. 236—20)

This invention relates to frying apparatus and, more particularly, to frying apparatus which is used in restaurants, food stands, and other eating places in which foods are prepared by cooking the same in hot liquid fat or cooking oil.

More particularly, this invention relates to a deep fat frying apparatus embodying an electric thermostatic control unit and to novel means embodied in the new frying apparatus for removably mounting the new thermostatic control unit in proper position of use on the housing of the deep fat fryer, and to novel means embodied in the invention for making and breaking the electric circuit embodied in the new fryer for controlling the operating means for the gas fuel line control valve.

Deep fat fryers and electric thermostatic control units therefor have been known and used heretofore but their use has involved certain problems and among these has been the fact that such deep fat fryers and electric thermostatic control units therefor are commonly used by persons who have little or no mechanical or electrical skill with the result that such people find it difficult to install certain of the prior art electric thermostatic control units in proper position of use in the housing of the deep fat fryer since this operation, in the use of certain such prior deep fat fryers and thermostatic control units therefor, necessitates the exercise of some degree of skill, although small, in installing the thermostatic control unit in proper position of use upon the housing of the deep fat fryer with which it is used.

More specifically, certain of the prior deep fat fryers and electric thermostatic control units therefor employ switch means in the form of a male electrical contact plug member which is mounted on and projects from the bottom wall of the housing of the thermostatic control unit and this male electrical contact plug member has a pair of male contact prongs thereon which are engageable in a female electrical contact receptacle which is mounted on the top of the front wall of the fryer housing, and the thermostatic control unit is located in position of use upon the top of the front wall of the housing of the deep fat fryer by locating the contact prongs on the male contact plug member in the female contact receptacle which is mounted on the top of the front wall of the housing of the deep fat fryer. However, since the proper positioning of the thermostatic control unit on the top of the front wall of the deep fat fryer housing is dependent upon locating and inserting the contact prongs of the male contact plug member in the corresponding female contact receptacle, people possessing little or no skill in the handling of electrical devices find it difficult and cumbersome, in the use of such prior thermostatic control units, to locate the thermostatic control unit in proper position of use upon the top of the front wall of the deep fat fryer, and this difficulty is increased if the contact prongs on the male contact plug member have been spread or bent out of proper position or alignment with the result that it then becomes difficult to insert them into the female contact receptacle on the top of the front wall of the deep fat fryer housing.

Accordingly, an object of the present invention is to provide a new and improved deep fat fryer and an electric thermostatic control unit therefor which is relatively simple and inexpensive in construction, but in which the parts are so designed, constructed and arranged that the thermostatic control unit may be readily mounted in position of use upon a wall of the housing of a deep fat fryer with which it is used without requiring any mechanical or other skill on the part of the user.

An additional object of the present invention is to provide a new and improved deep fat frying apparatus embodying a new and improved thermostatic control unit therefor which is so designed, constructed and arranged that the electric circuit to the operating means for the gas fuel line control valve of the deep fat fryer is broken in the initial stage or inception of the operation of lifting the electrical thermostatic control unit upwardly from its position of use on the top of the front wall of the housing of the new deep fat fryer.

Another object of the present invention is to provide a new and improved deep fat fryer and an electrical thermostatic control unit therefor which may readily be assembled in proper position of use upon the housing of the deep fat fryer entirely independently of and without the necessity for centering or locating any electrical contact prongs, or like electrical contact members, carried by the thermostatic control unit, in corresponding female contact elements mounted on a wall of the housing casing of the deep fat fryer, as in certain of the prior art deep fat fryers and electrical thermostatic control units therefor.

A further object of the invention is to provide a new and improved deep fat fryer and a new and improved thermostatic control unit therefor embodying novel means for locating the casing or housing of the thermostatic control unit on the top of the front wall of the housing of the new deep fat fryer.

Another object of the present invention is to provide a new and improved deep fat fryer and a new and improved thermostatic control unit therefor embodying a novel but simple and efficient switch means for opening the electrical circuit to the electrical operating means for the gas burner fuel control valve which controls the gas fuel supply line to the gas burner of the new deep fat fryer so as to shut off the gas fuel supply to the gas burner when the thermostatic control unit and attached temperature sensing devices are out of position to sense the temperature of the cooking oil or hot fat in the cooking oil or deep fat oil well in the housing of the new frying apparatus.

Other objects will appear hereinafter.

In the drawings:

FIG. 1 is a fragmentary perspective view of a deep fat fryer and thermostatic control unit therefor embodying the present invention and showing the new thermostatic control unit raised from its normal position of use on the top of the front wall of the housing of the new deep fat fryer;

FIG. 2 is a perspective view of the new deep fat fryer and of the new electric thermostatic control unit therefor, as shown in FIG. 1, but showing the new thermostatic control unit in its normal operating position on the top of the front wall of the housing of the new deep fat fryer;

FIG. 3 is a fragmentary sectional detail view on line 3—3 in FIG. 6, showing the novel switch means embodied in the present invention for controlling the electrical circuit to the operating means for the gas fuel supply line control valve for the gas burner embodied in the new deep fat fryer;

FIG. 4 is a fragmentary bottom perspective view of the new thermostatic control unit and of the novel means embodied in the present invention for mounting the thermostatic control unit in position of use upon the top of the front wall of the housing of the new deep fat fryer, and also illustrating the novel switch means embodied in the present invention for closing and opening the circuit to the operating means for the gas fuel line control valve;

FIG. 5 is an enlarged sectional plan view on line 5—5 in FIG. 2 showing the novel means embodied in the present invention for mounting the new thermostatic control unit in proper position of use upon the top of the front wall of the housing of the new deep fat fryer;

FIG. 6 is an enlarged fragmentary sectional view on line 6—6 in FIG. 2; and

FIG. 7 is a diagrammatic view illustrating the novel features of the electrical circuit arrangement and switch means embodied in the new deep fat fryer and in the new thermostatic control unit therefor.

A preferred embodiment of the new deep fat fryer or frying apparatus and the new electrical thermostatic control unit therefor, is shown in the drawings wherein it is generally indicated at 10, and comprised of a housing or casing 11 which includes side walls 12, a rear wall 13, and a front wall 14 having forwardly extending parallel upright side wall extensions 15. A horizontal bottom wall 16 extends between the forward extensions 15 of the side walls 12 and a horizontal top front wall 17 extends between the forward extensions 18 of the side walls 12 at the top and front of the housing 11. The forward extensions 18 of the top of the front wall 17 project forwardly between the forward extensions 15 of the side walls 12 and above the horizontal bottom panel 16. A closure member or door 19 is arranged at the front of the housing 11 and may be hingedly, or otherwise, mounted thereon, in any suitable manner.

A deep fat cooking oil well 20 for the reception of deep fat cooking oil is provided in the cabinet 11, and the deep fat cooking oil well 20 may be of any desired design and shape, in so far as the present invention is concerned.

The present invention includes a thermostatic control assembly or unit 21, most of the electrical parts of which are old and well-known in the art but which embodies certain novel features of design and construction which will be pointed out hereinafter. Thus, the new electrical thermostatic control unit 21 includes a housing or casing body 22 having a front wall 23 on which is rotatably mounted a thermostatic dial control knob 24. An "off" indicating signal unit 25 and "on" indicating signal unit 26 are provided in the housing 22 of the thermostatic control assembly or unit 21, behind the front wall 23 thereof, as is well understood in the art. The housing or casing body 22 of the new thermostatic control assembly or unit 21 includes a top wall 27 having depending end flanges 28 which project laterally outwardly from the end walls 29 of the housing 22 of the thermostatic control unit 21. The thermostatic control unit housing 22 also includes a depending rear flange 30 and this depending rear flange 30 extends rearwardly of the rear wall 31 of the housing 22 of the thermostatic control unit 21.

A U-shaped handle member 32 is hingedly mounted on the casing 22 of the thermostatic control unit 21. This handle member 32 has depending side arm portions 33 which are hingedly attached, as at 34, to the end walls 28 of the housing 22 of the thermostatic control unit 21, and the handle member 32 also includes a bale or handle grip portion 35 which extends between the depending arms 33 of the handle member 32 above the housing or casing 22 of the thermostatic control unit 21 (FIGS. 1 and 4).

Temperature-sensing devices 36 of the capillary type, and of conventional design and construction, and which form a part of the thermostatic control unit 21, are mounted on the housing 22 of the thermostatic control unit 21, and extend rearwardly and downwardly from the rear flange 30 of the housing 22 of the thermostatic control unit 21. These temperature-sensing devices 36 are adapted to be immersed in the deep fat oil in the oil well 20 of the housing 11 of the new fryer 10 for the purpose of sensing the temperature of the deep fat oil in the oil well 20 when the fryer 10 is in use, and for the purpose of communicating this information to the thermostatic means in the thermostatic control unit 21, as is well known in the art.

The new deep fat fryer includes novel means cooperating with the depending and generally U-shaped flange means 28—28—30 on the housing 22 of the thermostatic control unit 21 for properly positioning and mounting the thermostatic control unit 21 in position of use on the top of the front wall 17—18—18 of the housing 11 of the new deep fat fryer 10. To this end an upright transversely extending mounting flange 37 is provided on the top of the fryer housing 11 and parallel forwardly extending flanges 38—38 are provided on the top walls of the forward extensions 18—18 of the top front wall 17, these flanges 37—38—38 providing a generally U-shaped flange means for properly positioning the housing 22 of the thermostatic control unit 21 in proper position of use on the housing 11 of the fryer 10, as will be described presently.

A flexible electric conductor cable 39 leads from the bottom wall 40 of the housing 22 of the thermostatic control unit 21 and this flexible conductor cable 39 has a male contact plug member 41 attached thereto at its lower or outer end. This male contact plug member 41 is adapted to be removably inserted into a complementary female contact receptacle 42 which is flexibly mounted on the horizontal bottom wall 16 of the housing 11 of the new deep fat fryer 10 at the front thereof (FIG. 1).

The present invention includes novel means for closing and opening the circuit to the operating means for the gas fuel line burner control valve which is embodied in the new deep fat fryer, and to which reference will be made hereinafter. To this end a switch unit 60 of conventional design is mounted in the housing 22 of the thermostatic control unit 21 and this switch unit 60 includes a spring-urged switch-actuating member 43 which is slidably mounted in the bottom wall 40 of the housing 22 of the thermostatic control unit 21, adjacent one corner thereof (FIG. 4). The switch 60 is of conventional design and is of a type such that the switch-actuating member 43 is normally spring-urged downwardly and outwardly relative to the bottom wall 40 of the housing 22 of the thermostatic control unit 21 so as to close the switch 60. This switch-actuating member 43 is adapted to engage, or to be engaged by, a horizontally extending striker arm 44 of an L-shaped bracket member 44 which is mounted on the inner wall 46 of one of the forward extensions 18 of the top portion 17 of the front wall 14 of the deep fat fryer housing 11, as shown in FIGS. 1, 3, 4 and 6.

The electrical circuit embodied in the new frying apparatus is illustrated diagrammatically in FIG. 7 and includes an electrically actuated operating means or valve 47 for controlling a gas fuel line control valve 48 which is associated with the gas fuel supply line 49 to a gas burner unit (not shown), but which is arranged in the housing 11 of the new frying apparatus 10.

As shown in FIG. 7, one side of the switch 60 is connected by a conductor 50, to a contact in the male contact plug member 41 and the corresponding contact in the female contact receptacle member 42 is connected by a conductor 51, to one side of the electrically operated valve operating means 47 for the gas fuel line control valve 48. The other side of the electrically actuated gas fuel valve operating means 47 is connected, by a conductor 52, to one of the contact members in the female contact receptacle 42. A conductor 53 leads from one side of the male contact plug member 41 to one side of the "off" signal 25 which is embodied in the thermostatic control unit 21, and the "off" signal 25 is connected by a line 54, to a conductor 55 which, in turn, is connected, as at 56, to one side of the thermostatic control unit dial knob 24. The conductor 55 leads to one side of the "on" signal 26 which is embodied in the thermostatic unit or assembly 21, and a conductor 57 leads from the other side of the "on" signal 26 to a conductor 58 which, in turn, is connected to the thermostatic dial control knob 24, and a conductor 59 leads from the conductor 58 to one of the contacts in the male conact plug member 41.

It will be noted that the three conductors 53, 50 and 57—58—59, which lead from the housing 22 of the thermostatic control unit 21 to the male contact plug member 41 (FIG. 7) are housed in the flexible cable 39 which leads from the bottom wall 40 of the housing 22 of the thermostatic control unit 21 to the male contact plug member 41 (FIG. 1)

It will also be noted that the flexible conductor cable 39 which encloses the conductors 53, 50 and 57—58—59 has a substantial amount of slack in it between the bottom wall 40 of the housing 22 of the thermostatic control unit 21 and the male contact plug member 41, as shown in FIG. 1, for a reason which will be pointed out presently.

As best shown in FIGS. 1 and 4 of the drawings, the forward extensions 18 of the top portion 17 of the front wall 14 of the fryer housing 11 cooperate with the main extent of the top portion 17 of the front wall 14 to provide a well 61 for the reception of the housing 22 of the thermostatic control unit 21 and the upper marginal edge portion of this well 61 is defined by the generally U-shaped flange members 37—38—38.

In the use of the new deep fat frying apparatus, and of the thermostatic control unit 21 therefor, the male contact plug member 41 on the flexible cable 39 may be connected to the female contact receptacle 42, whereupon the thermostatic control unit 21 and attached temperature-sensing devices 36 may be mounted in position of use on the top 17 of the front wall 14 of the housing 11 of the new fryer 10, with the temperature sensing devices 36 extending into the deep fat oil well 20 in the housing 11 of the fryer 10.

Thus, in order to mount the thermostatic control unit 21 on the top portion 17 of the front wall 14 of the housing 11 of the fryer 10, the thermostatic control unit 21 may be manually grasped by the bale portion 35 of the handle member 32 and lowered into position of use in the well 61 of the housing 11 of the fryer 10 so that the housing 22 of the thermostatic control unit 21 is disposed in the well 61 between the forward etxensions 18 of the front wall 14 and the top portion 17 of the front wall 14 of the fryer housing 11. During this operation the depending flange 30 on the rear wall 31 of the housing 22 of the thermostatic control unit 21 engages with and over the upstanding transversely extending flange 37 on the top portion 17 of the front wall 14 of the fryer housing 11, and the depending end flanges 28 on the body of the housing 22 of the thermostatic control unit 21 engage with and over the upstanding end flanges 38 on the top portion 17 of the front wall 14 of the frying housing 11, so that when the thermostatic control unit 21 is thus assembled in position of use on the fryer housing 11 the parts are arranged in the position in which they are shown in FIGS. 2, 5 and 6.

As the housing 22 of the thermostatic control unit 21 is thus lowered into position of use in the well 61 of the housing 11 of the fryer 10 the slidable spring-urged switch actuating member 43 engages the horizontally extending striker arm 44 of the L-shaped bracket member 45 and is thus urged by the weight of the thermostatic control unit 21 resting thereon, into raised or circuit-closing position in and relative to the switch 60 in the housing 22 of the thermostatic control unit 21, thereby closing the circuit to the electrically actuated operating means or valve 47 for the gas fuel line burner control valve 48, as follows (FIG. 7): Current will then flow from the power source (FIG. 7) through the female contact receptacle 42 into the male contact plug member 41 and thence, by way of the conductor 50, switch 60, conductor 61, "on" signal 26 and conductors 57 and 59 to the contact members 41—42 and thence by way of conductor 51 to one side of the electrically operating means or valve 47 for the gas fuel line burner control valve 48, and thence by way of the conductor 52 back to the female contact receptacle 42. In this manner the electrically actuated operating means or valve 47 for the gas fuel line burner control valve 48 will be actuated by the switch 43—60 to open the gas supply line 49 to the burner unit (not shown) in the housing 11 of the fryer 10.

However, when it is desired to open or break the circuit to the electrically actuated operating means or valve 47 for the gas burner control valve 48, this may be readily accomplished by merely manually grasping the bale 35 of the handle 32 on the housing 22 of the thermostatic control unit 21 and lifting the thermostatic control unit 21 from its position of use on the top 17 of the front wall 14 of the housing 11 of the fryer 10, so as to disengage the depending flanges 28—28—30 on the housing 22 of the themostatic control unit 21 from engagement with the complementary upstanding flanges 37—38—38 on the top 17—18—18 of the front wall 14 of the fryer housing 11. As the thermostatic control unit 21 and attached temperature-sensing devices 36 are thus manually lifted from their position of use on and relative to the housing 11 of the fryer 10 the spring-urged switch actuating member 43 for the switch 60 is slidably spring-urged outwardly and downwardly relative to the housing 22 of the thermostatic control unit 21, thereby opening the switch 60 and opening or breaking the circuit from the power source, by way of the line 42—41—50—60—61—26—57—59—41—42—51—47—52, to the electrically actuated operating means or valve 47 for operating the gas burner control valve 48 (FIG. 7). In this manner the circuit to the electrically actuated operating means or valve 47 for the gas burner fuel control valve 48 is broken or opened at the inception of the operation of removing the thermostatic control unit 21 and attached temperature-sensing devices 36 from their position of use on and relative to the huosing 22 of the fryer 10, so that the electrical operating circuit to the electrically-actuated operating means or valve 47 for the gas fuel line control valve 48 is opened at the inception of the operation of removing the thermostatic control unit 21 and attached temperature-sensing devices 36 from their position of use and as the thermostatic control unit 21 and attached temperature-sensing devices 36 are moved out of a position in which they are able to sense the temperature of the hot fat or cooking oil in the well 20. In this manner the gas fuel supply to the gas fuel line 49 to the gas burner (not shown) is shut off at the inception of the operation of moving the thermostatic control unit 21 and attached temperature-sensing devices 36 out of position to sense the temperature of the cooking oil or hot fat in the oil well 20, thereby minimizing any danger of overheating the cooking oil or hot fat in the oil well 20 and resultant fire hazard.

It will be noted, in this connection, that the substantial amount of slack in the flexible conductor cable 39 which leads from the bottom wall 40 of the housing 22 of the thermostatic control unit 21 to the male contact plug member 41 and which amount of slack is sufficient to enable the thermostatic control unit 21 and attached temperature-sensing devices 36 to be manually lifted completely from their position of use on and relative to the housing 11 of the fryer 10 without disengaging the male contact plug member 41 from the female contact receptacle 42.

It will also be noted that as the thermostatic control unit 21 is thus manually lifted from its position of use on the top 17—18—18 of the front wall 14 of the fryer housing 11 the circuit to the operating parts embodied in the thermostatic control unit 21 is broken by the switch 60 which, when opened, interrupts the circuit flow from the power source by way of the female contact receptacle 42, male contact plug member 41, and the line 50—60—61—55 to the thermostatic dial control knob 24 and associated parts of the thermostatic control unit 21, thereby interrupting current flow to the thermostatic control unit 21 without disengaging the male contact plug member 41 from the female contact receptacle 42.

If and when it is desired to detach the thermostatic control unit 21 entirely from the fryer housing 11 for replacement or repair this may readily be accomplished by lifting the thermostatic control unit 21 from its normal position of use on the wall 61 of the fryer housing 11 and detaching the male contact plug member 41 from engagement with the female contact receptacle 42.

It will also be noted that in the practice of the present invention the thermostatic control unit 21 is readily positioned and located on the top 17—18—18 of the front wall 14 of the housing 11 of the new fryer 10 by merely manually grasping the handle 32 and lowering the thermostatic control unit 21 into position of use as set forth above, entirely independently of the male contact plug member 41 and female contact receptacle 42, and without the need for or necessity for locating contact prongs of a male contact plug member, carried by the housing of the thermostatic control unit, in a corresponding female contact receptacle carried by the fryer housing, as in certain of the prior art devices. Moreover, it will be noted that the insertion of the male contact plug member 41 into the female contact receptacle 42 has nothing, whatever, to do with the positioning or locating of the thermostatic control unit 21 in proper position of use on the top 17—18—18 of the front wall 14 of the fryer housing 11.

It is to be understood that the electrical parts of the thermostatic control unit 21 are, in general, of known design and construction, except for such changes therein as have been indicted herein and as are recited hereinafter in the claims. Hence, no claim is made to the electrical aspects of the thermostatic control unit 21, or to the temperature-sensing devices 38 associated therewith, except to the extent above stated or as hereinafter claimed.

It will thus be seen from the foregoing description, considered in conjunction with the accompanying drawings, that the present invention provides a new and improved deep fat frying apparatus and a new and improved thermostatic control unit therefor, and that the invention thus has the desirable advantages and characteristics and accomplishes its intended objects including those hereinbefore pointed out and others which are inherent in the invention.

I claim:

1. Frying apparatus of the type which is adapted to be heated by a gas burner unit under control of an electrically-actuated gas fuel line control valve, comprising a housing including side walls, a rear wall, a front wall and having a deep fat cooking oil well therein, an electrical operating circuit including electrically actuated means for controlling the operation of said electrically-actuated gas fuel line control valve, a thermostatic control unit comprising a housing including a top wall, side walls, end walls and a bottom wall, said electrical operating circuit including stationary electrical contact means mounted on a wall of the said fryer housing, flange means on a wall of the said fryer housing, complementary flange means on the said thermostatic control unit housing adapted to coact with the said flange means on a wall of the said fryer housing for positioning and retaining the said thermostatic control unit and its housing in position of use on the said wall of the fryer housing, a flexible electrical power conductor cable having an inner end portion attached to the said thermostatic control unit housing and including an outer end portion having electrical contact means attached thereto detachably attachable to the said stationary contact means for supplying electric power to the said electrical operating circuit, a control switch for the said electrical operating circuit including a switch-actuating member movably mounted in a wall of the said thermostatic control unit housing and means carried by a wall of the said fryer housing and engageable by the said switch-actuating member when the said thermostatic control unit is moved into operating position on the said wall of said fryer housing to close the said electrical operating circuit to the said electrically actuated means for controlling the operation of the said gas fuel line control valve.

2. Frying apparatus as defined in claim 1 in which the said means carried by a wall of the said fryer housing and engageable by the said switch-actuating member is in the form of a striker member mounted on a wall of the said fryer housing and projecting laterally therefrom and in which the said switch-actuating member is slidably mounted in the bottom wall of the said thermostatic control unit housing and engages the said striker member and is moved upwardly thereby into position to close the said control switch so as to energize the said electrical operating circuit to the said electrically-actuated means for operating the said gas fuel line control valve when the said housing for the said thermostatic control unit is moved into position to engage the said flange means.

3. Frying apparatus as defined in claim 1 in which the said flexible electrical power conductor cable is substantially longer than the distance between the said housing for the said thermostatic control unit and the said stationary contact means on a wall of the said fryer housing so that the said thermostatic control unit may be manually lifted from its position of use on a wall of the said fryer housing to disengage the said flange means without disconnecting the said electrical contact means carried by the said flexible electric power conductor cable from the said stationary electrical contact means.

4. Frying apparatus as defined in claim 1 in which the said means carried by a wall of the said fryer housing and engageable by the said switch-actuating member is in the form of a striker member mounted on a wall of the said fryer housing, and in which the said switch-actuating member is slidably mounted in the bottom wall of said thermostatic control unit housing and engages the said striker member and is raised thereby into position to close the said control switch to the said electrical operating circuit when the said thermostatic control unit and its housing are moved into position to engage the said flange means, and in which the said flexible electrical power conductor cable is substantially longer than the distance between the said housing for the said thermostatic control unit and the said stationary contact means so that the said thermostatic control unit may be manually lifted from its position of use on a wall of said housing to disengage said flange means without disconnecting the said electrical contact means carried by the said flexible electrical power conductor cable from the said stationary electrical contact means.

5. Frying apparatus as defined in claim 1 in which the said housing for the said thermostatically control unit has a generally U-shaped handle member attached thereto, and in which the said generally U-shaped handle member includes a pair of depending arm portions each hingedly attached to one side wall of the said housing for the said thermostatic control unit, and in which said handle member includes a bale or handle grip member extending across the top wall of the said housing for the said thermostatic control unit between the said depending arm portions thereof.

6. Frying apparatus as defined in claim 1 in which the said front wall of the said fryer housing includes a body including a top wall portion and a pair of forwardly extending portions, and in which the said top wall portion and the said forwardly extending portions of the said front wall of the said fryer housing cooperate to provide a well at the front of the said fryer housing, and in which the said flange means on the said fryer housing is in the form of generally U-shaped flange member having a portion extending over the said top portion of the said front wall and over the said forward extensions on the said front wall of the said frying housing along the marginal edges of the said well, and in which the said flange means on the said housing of the said thermostatic control unit is engageable with the said U-shaped flange member on the said top portion and on the said forwardly extending portions of the said front wall of the said fryer housing for positioning and mounting the said thermostatic control unit in position of use in the said well of the said frying housing.

7. Frying apparatus as defined in claim 1 in which the said means carried by a wall of the said fryer housing and engageable by the said switch-actuating member is in the form of a striker member mounted on a wall of the said fryer housing and projecting laterally therefrom and in which the said switch-actuating member is slidably mounted in the bottom wall of the said thermostatic control unit housing and engages the said striker member and is moved upwardly thereby into position to close the said control switch so as to energize the said electrical operating circuit to the said electrically-actuated means for operating the said gas fuel line control valve when the said housing for the said thermostatic control unit is moved into position to engage the said flange means, and in which the said thermostatic control unit has temperature sensing means attached thereto and adapted to be positioned in the said deep fat cooking oil well when the said thermostatic control unit is in position of use on the said housing of the said frying apparatus, and in which switch-actuating member is moved into position to open the said electrical circuit to the said electrically-actuated means for operating the said gas fuel line control valve so as to close the said gas fuel line control valve and shut off the gas fuel supply to the gas burner embodied in the frying apparatus at the inception of the operation of moving the said thermostatic control unit and attached temperature-sensing means from position of use and from position to sense the temperature of the deep fat cooking oil in the said deep fat cooking oil well.

References Cited by the Examiner

UNITED STATES PATENTS

| | | | |
|---|---|---|---|
| 2,756,321 | 7/56 | Pappas | 219—438 |
| 2,801,319 | 7/57 | Eargle | 236—33 |
| 3,075,702 | 1/63 | Pappas | 236—32 |

FOREIGN PATENTS 874,848    8/61    Great Britain.

EDWARD J. MICHAEL, *Primary Examiner.*